Figure 1:
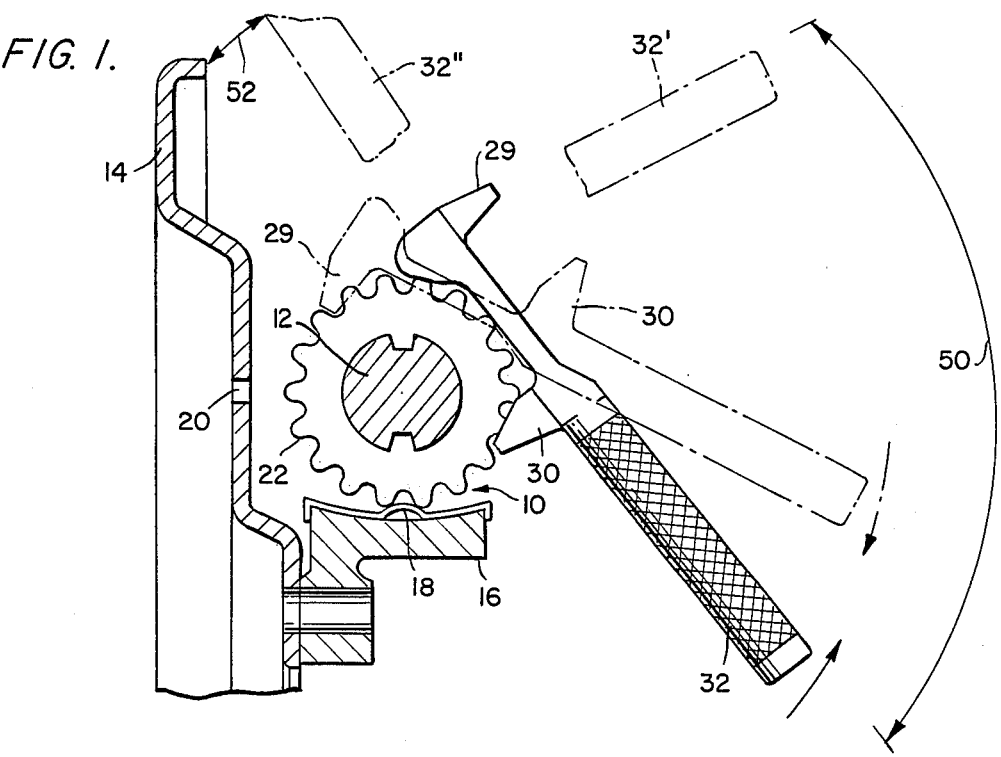

United States Patent [19]
Gaug

[11] Patent Number: 4,713,991
[45] Date of Patent: Dec. 22, 1987

[54] TOOL FOR MANUALLY ROTATING THE STAR WHEEL OF A BRAKE ADJUSTER

[76] Inventor: Robert T. Gaug, 1476 St. Stephens Church Rd., Crownsville, Md. 21032

[21] Appl. No.: 425,374

[22] Filed: Sep. 28, 1982

[51] Int. Cl.$^4$ ............................................. B25B 13/02
[52] U.S. Cl. .................................................. 81/176.1
[58] Field of Search .................. 81/90 B, 90 C, 90 D, 81/119, 176.1

[56] References Cited

U.S. PATENT DOCUMENTS

| | | | |
|---|---|---|---|
| 1,709,075 | 4/1929 | Howard | 81/90 B |
| 2,360,163 | 10/1944 | Sadler | 81/90 B |
| 3,211,029 | 10/1965 | Schlage et al. | 81/90 B |
| 3,721,137 | 3/1973 | Mosher | 81/90 B |

Primary Examiner—Frederick R. Schmidt
Assistant Examiner—Debra S. Meislin
Attorney, Agent, or Firm—Scrivener and Clarke

[57] ABSTRACT

A tool for manually rotating the star wheel of a brake adjuster is provided having an elongated body with two spaced projections extending substantially normal to the axis of the body and preferably in opposite direction. The projection carry at their ends opening or similar arrangement for engaging individual teeth and the tool is slotted between the projections to accomodate the width of the star wheel. The tool provides an alternative for manually turning a resisting star wheel by the tedious one-tooth-at-a-time turning required by the use of so-called adjusting spoons.

7 Claims, 2 Drawing Figures

TOOL FOR MANUALLY ROTATING THE STAR WHEEL OF A BRAKE ADJUSTER

SUMMARY OF THE INVENTION

This invention relates to tools and more particularly to a tool for manually rotating the star wheel of a brake adjuster.

As brake shoes wear, an adjuster is operated either manually or automatically to reduce the increased clearance between a partially worn shoe and the friction surface of a rotary member, such as a drum. The vast majority of brake adjusters utilize a star wheel having peripheral teeth engageable for automatic adjustment by a pawl, or, for manual adjustment, by a tool known as a brake spoon, similar to a screw driver, and inserted through an opening in the brake backing plate to rotate the wheel one tooth at a time to advance a threaded part of an extensible strut which is extended to its maximum length when the shoes have been fully worn. When the shoes are to be replaced the star wheel must be backed off to reduce the strut to its minimum length to permit insertion of a new shoe and then the star wheel must be turned in the opposite direction until the proper clearance of the shoe with the friction surface is achieved.

A problem which often faces the mechanic is difficulty in rotating the star wheel particularly after the brake mechanism has been exposed to dirt and corrosion over the relative long period of time it takes for a new brake shoe to wear to a condition requireing its replacement. Though the brake drum must be removed in order to effect shoe replacement and thus the star wheel is exposed to the outer side of the vehicle wheel, if the resistance to rotation of the threaded member is too high for the star wheel to be turned by conventional tools, such as pliers, the mechanic has heretofore had no choice but to position himself beneath the vehicle in order to insert the spoon through the opening in the backing plate to achieve sufficient leverage to rotate the star wheel one tooth at a time until the strut is moved from one limit of its adjustable length to the other. Such an operation is tiring, tedious and wasteful of the valuable time of a skilled mechanic, and can unduly delay the return of the vehicle to the road, which, if it is a commercial vehicle, can be costly.

The broad object of the present invention is to provide a tool for manually rotating a star wheel, even when subjected to significant frictional resistance, in either direction a substantial distance for each stroke of the tool.

Because of the relative position of many star wheels with respect to the backing plate, a tool which engages a star wheel for rotation in one direction cannot merely be reversed for rotating the wheel in the opposite direction simply because the reversed tool would engage the backing plate before the wheel could be rotated any substantial distance. Hence another object of the invention is to provide a star wheel rotating tool which enables the wheel to be rotated in either direction with the tool disposed in substantially the same relative position with respect to the star wheel regardless of the direction in which it is rotated by the tool.

The foregoing and other objects of the invention will become apparent as the following detailed description is read in conjunction with the accompanying drawings wherein.

Figure 2:
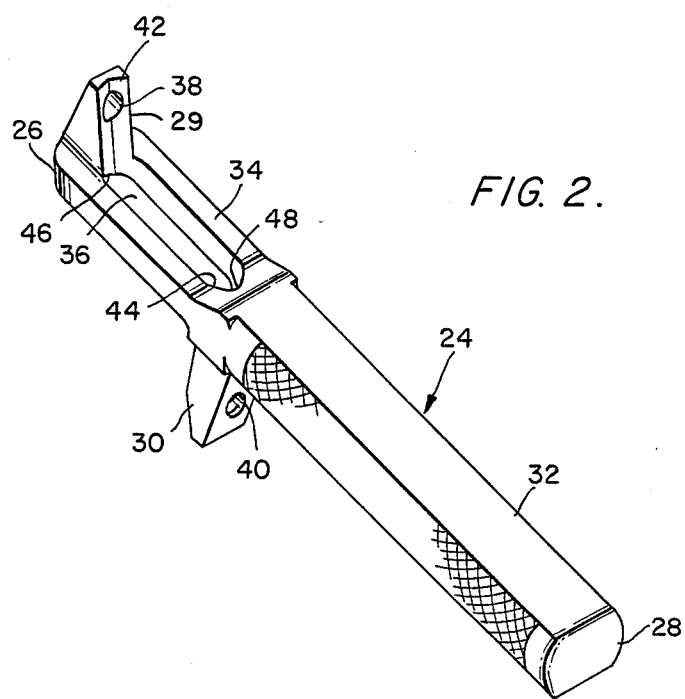

FIG. 1 is a vertical, broken cross-sectional view of a representative brake backing plate showing a typical star wheel adjuster and the tool of the present invention; and FIG. 2 is an enlarged perspective view of the tool of the invention.

Though brake adjusters may vary widely as to details, in common with most is a star wheel such as the one illustrated at 10 in FIG. 1 which may be slideably splined on a threaded member 12 received in a threaded opening in a fixed element (not shown) carried by a brake backing plate 14. The star wheel 10, in the environment shown, rotates in a slot which co-axially intersects the threaded opening, the sides of the slot constraining the star wheel against any lateral movement as it is rotated either manually or by a pawl to screw the threaded member 12 into or out of its threaded opening to adjust a brake shoe clearance with respect to the drum. It should be clearly understood that the tool of the invention is not restricted to use with adjusters of the type shown, which is merely representative of one of a vast number of different adjusters with which the tool may be used.

As shown, there is a bracket 16 adjacent the wheel and carried on the bracket is a spring member 18 which bears against two adjacent teeth of the star wheel 10 to restrain rotation of the star wheel except when it is deliberately rotated by a pawl of an automatic adjuster or by a brake spoon which may be inserted through an opening 20 in the backing plate to engage the individual teeth 22 of the star wheel 10. The left side of the plate 14 is on the inner side of the vehicle wheel and the only way the spoon can be inserted through the opening 20 is by a mechanic positioned beneath the vehicle, as explained above, to engage the teeth to rotate the star wheel one tooth at a time. For manual operation requiring adjustment of the shoe over a mere fraction of an inch, the use of a spoon is quite practical and brake adjustment takes only a few minutes. However, when the shoe must be replaced after the screw threaded member has been advanced its maximum distance, the time required to return the threaded member to its retracted position by operating the star wheel tooth by tooth can be prohibitive. Even though the brake drum is removed, as it must before shoe replacement, it may be difficult or impossible to turn the star wheel by conventional tools, such as pliers and the mechanic then has no choice but to resort to the use of the spoon in order to achieve the necessary leverage to rotate the wheel.

The present invention was conceived to provide an alternative to other means for rotating star wheels, and, with reference to FIG. 2, the tool of the invention comprises an elongated body 24 having a front end 26 and a rear end 28. Adjacent the front end 26 of the body is a projection 29 substantially normal to the axis of the body and spaced rearwardly of the projection 29 intermediate the ends of the body 24 is a second projection 30 which is also normal to the axis of the body but extends in a direction opposite to that of the first projection 29. That portion of the body between its rear end 28 and the projection 30 defines a handle 32. The portion 34 of the body between the two projections 29, 30 is straight and is provided with a slot 36 of a width to accomodate therein a segment of a star wheel. Each of the projections adjacent its outer end is provided with means for engaging a tooth of the star wheel for exerting a torque on the wheel when the handle is moved in one direction or the other as more fully explained below. The tooth engaging means shown are holes 38, 40 adjacent the outer ends of the respective projections but obviously the engaging means could be hook-like formations.

Additionally, the projections 29, 30 are provided on their inner faces with respective grooves 42, 44, each of which extends from end to end of its projection. The grooves, which may conveniently be trough-shaped as shown, partially embrace two circumferentially spaced teeth engaged respectively by an opening in one projection, say opening 38 in projection 29, and by the inner end 48 of the groove of the opposite projection to locate the tool on the wheel and restrain it from moving laterally with respect to the wheel. The purpose of the central slot 36 is to permit the tool to be used with various wheels whose diameters may vary over a reasonable wide range. So long as a wheel diameter is greater than the length of the slot 36, it will be apparent that when one tooth is engaged in the opening of one projection the inner edge, either 46 or 48, of the groove of the other projection at the opposite end of the slot 36 must always abut a second, circumferentially spaced tooth in order that a proper turning torque can be exerted on the wheel.

The operation of the tool should be apparent from FIG. 1. If the star wheel is to be turned counterclockwise in FIG. 1 the hole 40 of the intermediate projection 30 is engaged with a tooth of the star wheel and the lower edge 46 of the groove 42 of the other projection 29 at the opposite end of the slot 36 is engaged with a circumferentially spaced tooth and when the mechanic pulls upwardly on the handle to move it to the position 32', the star wheel will be turned through an arc indicated by the numeral 50 which, for the arrangement shown, is about one quarter of a revolution. If the mechanic wishes to turn the star wheel in the opposite direction he merely turns the tool over as shown in the superimposed dotted lines in FIG. 1 and with the handle first raised to the position 32' he pushes down on the handle until it arrives at the solid line position, or somewhat beyond until it engages the bracket 16 thus turning the star wheel a quarter of a revolution or more for each rocking motion of the tool.

A feature of the invention resides in the use of the two projections rather than only one. If only the projection 29 at the end of the tool were provided and one wished to rotate the wheel counterclockwise, the one projection could only be engaged with the star wheel with the handle in the position 32". Now when the mechanic pushed the handle counter clockwise it can only travel a distance represented by the arc 52 before the handle strikes the back plate. The arc 52 is hardly more than that which would be subtended when the wheel is rotated a distance of a single tooth by means of a spoon as explained above. By providing two projections, the foregoing problem is obviated since clearly the handle can be always in substantially the same relative position with respect to the star wheel irrespective of the direction of rotation thereof.

The invention as described above is susceptible of modification and changes without, however, departing from the scope and spirit of the appended claims.

What is claimed is:

1. A tool for manually rotating the star wheel of a brake adjuster comprising an elongated body having front and rear ends, a first projection on said body adjacent the front end thereof and extending in one direction substantially normal to the axis thereof, a second projection on said body spaced rearwardly of the first projection and intermediate the ends of said body, said projection extending normal to the axis of said body in a direction opposite from said first projection, the spacing between said second projection and the rear end of said body defining a handle, means on each of said projections engageable with a first tooth of a star wheel, first and second abutment means on said body each being on a side of said body opposite a respective projection. and each being abuttingly engageable with a respective second tooth on said star wheel when a projection is engaged with a respective first tooth so as to enable said wheel to be rotated in either direction and with said handle disposed in substantially the same positions relative to the star wheel regardless of the direction in which it is rotated.

2. A tool as in claim 1 wherein the tooth engaging means comprises holes through said projections adjacent the outer ends thereof.

3. A tool as in claim 1 wherein the portion of said body between said projections is substantially straight.

4. A tool as in claim 3 wherein the straight portion of said body has a slot therein of a width to accommodate the width of a star wheel and extending substantially between said abutment means whereby there is an abutment means at each end of said slot.

5. A tool as in claim 4 wherein the respective projections and abutment means are at the opposite end of said slot, a groove on the inner side of each of said projections and extending to each of said abutment means, each groove being of a size to accommodate the width of a star wheel to and in locating said tool in its operative position on a star wheel.

6. A tool as in claim 1 wherein each of said projections has a groove on the inner side thereof of a size to accommodate the width of a star wheel to aid in locating said tool in its operative position on a star wheel.

7. A tool as in claim 6 wherein each of said grooves is substantially co-extensive with said projection.

* * * * *